(12) United States Patent
Ding

(10) Patent No.: US 11,984,825 B2
(45) Date of Patent: May 14, 2024

(54) ELECTRIC TOOL AND METHOD FOR CONTROLLING SAME

(71) Applicant: Globe (Jiangsu) Co., Ltd., Changzhou (CN)

(72) Inventor: Haiyun Ding, Changzhou (CN)

(73) Assignee: Globe (Jiangsu) Co., Ltd., Changzhou (CN)

(*) Notice: Subject to any disclaimer, the term of this patent is extended or adjusted under 35 U.S.C. 154(b) by 397 days.

(21) Appl. No.: 17/359,623

(22) Filed: Jun. 27, 2021

(65) Prior Publication Data

US 2021/0408946 A1 Dec. 30, 2021

(30) Foreign Application Priority Data

Jun. 29, 2020 (CN) .......................... 202010601884.1

(51) Int. Cl.
*A01D 34/66* (2006.01)
*A01D 34/74* (2006.01)
*H02P 1/02* (2006.01)
*H02P 3/02* (2006.01)
*E01H 5/09* (2006.01)

(52) U.S. Cl.
CPC ................. *H02P 1/02* (2013.01); *H02P 3/02* (2013.01); *E01H 5/098* (2013.01)

(58) Field of Classification Search
CPC .................................................. H02M 10/44
See application file for complete search history.

(56) References Cited

U.S. PATENT DOCUMENTS 7,997,016 B2 * 8/2011 Yamazaki ................. E01H 5/04
  37/234
2005/0097788 A1 * 5/2005 Wakitani ............... F02D 41/042
  37/348

FOREIGN PATENT DOCUMENTS

CN 110857552 A 3/2020

* cited by examiner

*Primary Examiner* — Kawing Chan
*Assistant Examiner* — Charles S Laughlin

(57) ABSTRACT

The present disclosure provides an electric tool and a control method thereof. The electric tool comprises a walking unit and a working unit, wherein the walking unit comprises a walking assembly, a walking control assembly, and a walking switch assembly; the working unit comprises a working assembly, a working control assembly, and a working switch assembly; when at least one of the walking switch assembly and the working switch assembly is turned on, at least one of the walking control assembly and the working control assembly receives a lock signal; and when the walking switch assembly and the working switch assembly are both turned on, and then the switch assembly corresponding to the control assembly that receives the lock signal remains on, at that time the control assembly that receives the lock signal simultaneously controls the walking assembly and the working assembly to work.

19 Claims, 6 Drawing Sheets

ELECTRIC TOOL AND METHOD FOR CONTROLLING SAME

FIELD OF TECHNOLOGY

The present disclosure relates to an electric tool and a method for controlling the same.

BACKGROUND

A snow thrower is important equipment for snow removal in winter, and usually includes a prime mover, a transmission device, a snow collecting device, a snow throwing device, a walking device and a control device. The prime mover may be an electrical motor, an engine, or the like. To reduce the overall weight of the snow thrower and make it more environment-friendly, the snow thrower on the market at present usually uses an electrical motor. The snow collecting device is used to collect accumulated snow, and may be a snow pushing shovel, an auger, or the like. The walking device is used to enable the snow thrower to move forward, and may be of a hand-push type and a self-propelled type. However, the existing self-propelled snow thrower needs to be operated by an operator with both hands, i.e., one hand pressing a first handle to control the snow collecting device to work and the other hand pressing a second handle to control the walking device to work. When the walking speed, direction, snow throwing angle or the like needs to be adjusted, a user usually needs to make available one hand first, and then control a speed regulating button, a reverse button, a snow throwing angle regulating button or the like, and at that time either the snow thrower stops walking, or the snow collecting device stop working. Such configuration not only brings inconvenience to the user but also reduces the efficiency of the user.

In view of the above problems, there is a need to provide a novel snow thrower.

SUMMARY

An advantage of the present disclosure is that it provides an electric tool, which uses one of a walking control assembly and a working control assembly to send a lock signal to the other, such that the walking control assembly or the working control assembly can simultaneously control a walking assembly and a working assembly to work, which enables a user to control, with one hand, the walking assembly and the working assembly to work at the same time, thereby facilitating the user to control, with the other hand, other functional assemblies without stopping the machine, thus effectively improving the work efficiency of the user.

To achieve the above advantage, the present disclosure provides an electric tool, including: a walking unit, the walking unit including a walking assembly, a walking control assembly, and a walking switch assembly, the walking control assembly controlling the walking assembly to work when the walking switch assembly is turned on; and a working unit, the working unit including a working assembly, a working control assembly, and a working switch assembly, the working control assembly controlling the working assembly to work when the working switch assembly is turned on, wherein when at least one of the walking switch assembly and the working switch assembly is being operated, at least one of the walking control assembly and the working control assembly receives a lock signal; and when the switch assembly corresponding to the control assembly receiving the lock signal is on, the control assembly receiving the lock signal simultaneously controls the walking assembly and the working assembly to work.

As a further improvement of the present disclosure, when the walking switch assembly is turned on, the walking control assembly sends a lock signal to the working control assembly; when the working switch assembly is turned on, the working control assembly sends a lock signal to the walking control assembly; and when the walking switch assembly and the working switch assembly are in an on state, and either one thereof is switched off, the control assembly corresponding to the switch assembly that is not switched off controls simultaneously the walking assembly and working assembly to work.

As a further improvement of the present disclosure, after the walking switch assembly is turned on, the walking control assembly sends a lock signal to the working control assembly; and when the working switch assembly is in an on state, the working control assembly that receives the lock signal simultaneously controls the walking assembly and the working assembly to work.

As a further improvement of the present disclosure, after the walking switch assembly is turned on, the walking control assembly immediately sends the lock signal to the working control assembly.

As a further improvement of the present disclosure, after the walking switch assembly is turned on, the walking control assembly sends the lock signal to the working control assembly after a delay of a preset time.

As a further improvement of the present disclosure, after the working switch assembly is turned on, the working control assembly sends a lock signal to the walking control assembly; and when the walking switch assembly is in an on state, the walking control assembly that receives the lock signal simultaneously controls the walking assembly and the working assembly to work.

As a further improvement of the present disclosure, after the working switch assembly is turned on, the working control assembly immediately sends the lock signal to the walking control assembly.

As a further improvement of the present disclosure, after the working switch assembly is turned on, the working control assembly sends the lock signal to the walking control assembly after a delay of a preset time.

As a further improvement of the present disclosure, when the walking switch assembly is turned off, the walking control assembly sends a lock signal to the working control assembly; when the working switch assembly is turned off, the working control assembly sends a lock signal to the walking control assembly; and when the walking switch assembly and the working switch assembly are in an on state, and either one thereof is switched off, the control assembly corresponding to the switch assembly that is not switched off controls simultaneously the walking assembly and working assembly to work.

As a further improvement of the present disclosure, when a switch assembly in an off state is turned on again, the control assembly corresponding to the switch assembly that is turned on again sends an unlock signal to the control assembly corresponding to the switch assembly that remains on, at which time the walking control assembly controls only the walking assembly, and the working control assembly controls only the working assembly.

As a further improvement of the present disclosure, the electric tool is further provided with a power source and a power-on switch; and when the power-on switch is turned on, the power source supplies power to the walking unit and/or working unit.

As a further improvement of the present disclosure, the electric tool is further provided with a detection unit to detect whether the walking unit or the working unit works within a preset time window; and if the walking unit or working unit does not work within the preset time window, the detection unit turns off the power-on switch or cuts off the power source.

As a further improvement of the present disclosure, the working assembly is a snow sweeping assembly.

The present disclosure further discloses a method for controlling an electric tool, including a walking unit and a working unit, the walking unit including a walking assembly, a walking control assembly, and a walking switch assembly, and the working unit including a working assembly, a working control assembly, and a working switch assembly. The method includes the following steps: S1: turning on the walking switch assembly or the working switch assembly such that the walking control assembly sends a lock signal to the working control assembly or the working control assembly sends a lock signal to the walking control assembly; S2: determining whether the walking control assembly or the working control assembly receives the lock signal; if the walking control assembly receives the lock signal, proceeding to S3; and if the working control assembly receives the lock signal, proceeding to S4; S3: detecting whether the walking switch assembly is on; if yes, controlling the working assembly by the walking control assembly; otherwise, still controlling the working assembly by the working control assembly; S4: detecting whether the working switch assembly is on; if yes, controlling the walking assembly by the working control assembly; otherwise, still controlling the walking assembly by the walking control assembly; and S5: determining whether the switch assembly corresponding to the control assembly that receives the lock signal is off; and if yes, controlling, by the control assembly that receives the lock signal, the walking assembly and the working assembly to stop working.

As a further improvement of the present disclosure, the walking control assembly immediately sends the lock signal to the working control assembly, or the working control assembly immediately sends the lock signal to the walking control assembly.

As a further improvement of the present disclosure, the walking control assembly sends the lock signal to the working control assembly after a delay of a preset time, or the working control assembly sends the lock signal to the walking control assembly after a delay of a preset time.

As a further improvement of the present disclosure, when the walking switch assembly is turned off after the walking switch assembly is turned on, the walking control assembly sends the lock signal to the working control assembly.

As a further improvement of the present disclosure, when the working switch assembly is turned off after the working switch assembly is turned on, the working control assembly sends the lock signal to the walking control assembly.

As a further improvement of the present disclosure, step S5 further includes: determining whether the switch assembly corresponding to the control assembly that does not receive the lock signal is switched on; and if yes, sending, by the control assembly that does not receive the lock signal, an unlock signal to the other control assembly, such that the walking control assembly independently controls the walking assembly to work, and the working control assembly independently controls the working assembly to work.

As a further improvement of the present disclosure, the method for controlling an electric tool further includes step S0: detecting whether the walking unit or the working unit works within preset time; and if not, cutting off a power source that supplies power to the walking unit and/or the working unit.

The present disclosure has the following beneficial effects: the electric tool of the present disclosure uses one of a walking control assembly and a working control assembly to send a lock signal to the other, such that the walking control assembly or the working control assembly can simultaneously control a walking assembly and a working assembly to work, which enables a user to control, with one hand, the walking assembly and the working assembly to work at the same time, thereby facilitating the user in controlling, with the other hand, other functional assemblies without stopping the machine, thus effectively improving the efficiency of the user.

DETAILED DESCRIPTION

To make the technical solutions and advantages of the present disclosure clearer, the present disclosure will be described in detail below in conjunction with the accompanying drawings and specific embodiments.

Figure 1:
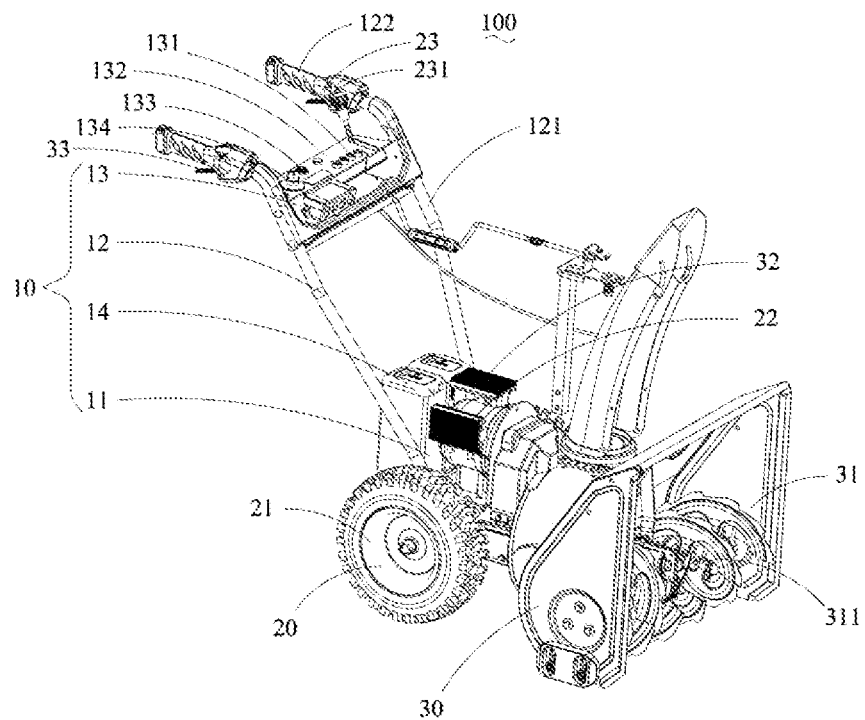
FIG. 1 is a perspective view of an electric tool according to an embodiment of the present disclosure.
Figure 2:
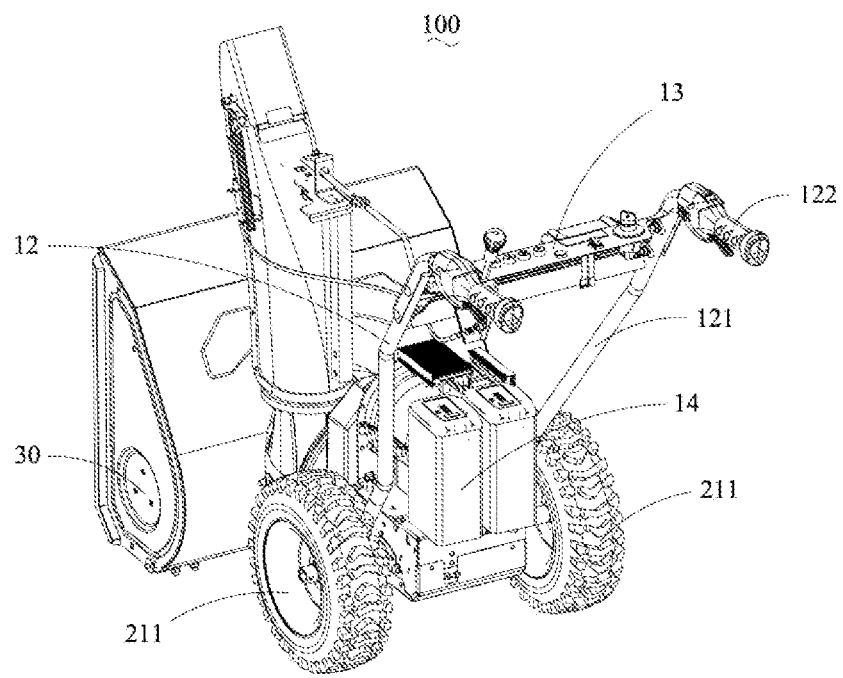
FIG. 2 is a perspective view of the electric tool shown in FIG. 1 at another angle.

Referring to FIGS. 1 and 2, the present disclosure provides an electric tool 100, which includes a main body 10, a walking unit 20 mounted to the main body 10 to drive the main body 10 to walk, and a working unit 30 for performing a working function of the electric tool 100.

Referring to FIGS. 1 and 2, the main body 10 includes a frame 11, an operating assembly 12 mounted to the frame 11, a functional assembly 13 mounted to the operating assembly 12, and a power source 14. The operating assembly 12 includes a pair of handles 121 and grip portions 122 mounted to the handles 121. One end of each of the pair of handles 121 is fixedly mounted to the frame 11; and the grip portions 122 are fixedly mounted to ends of the handles 121 away from the frame 11 for a user to hold by hand. The functional assembly 13 is mounted to the handles 121 and located at ends of the handles 121 close to the grip portions 122.

Figure 3:
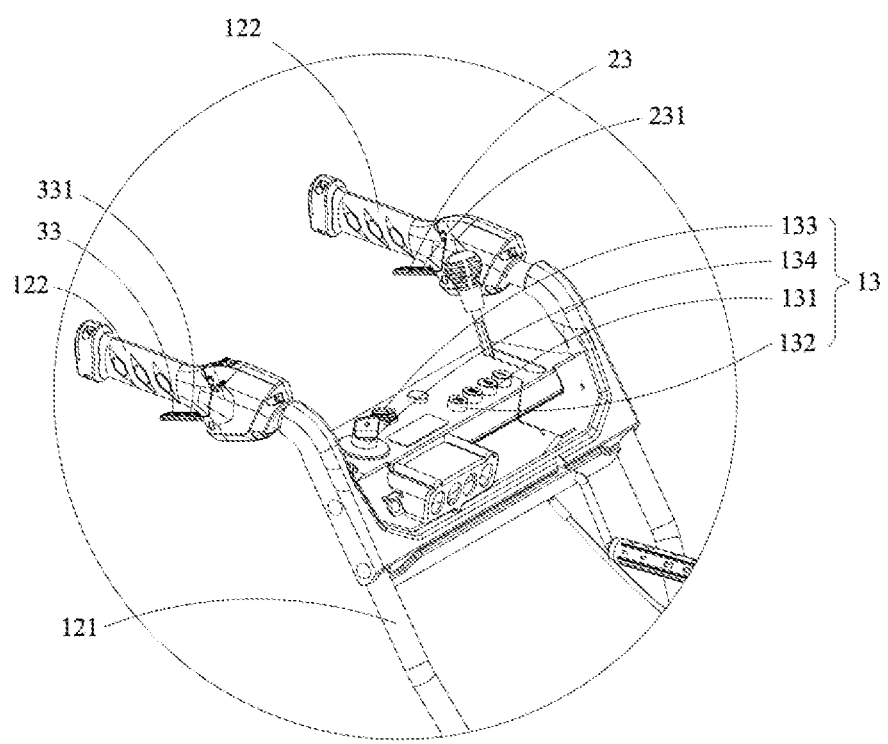
FIG. 3 is a partial enlarged view of the electric tool shown in FIG. 1.

Referring to FIG. 3, the functional assembly 13 includes speed regulating buttons 131 for regulating the walking speed of the walking unit 20, a reverse button 132 for controlling the electric tool 100 to reverse, a lighting switch 133, a power-on switch 134, and a detection unit (not shown). In this embodiment, three speed regulating buttons 131 are provided, which are respectively configured to control the walking unit 20 to walk at different travel speeds. Of course, it may be appreciated that in other embodiments, the number of the speed regulating buttons 131 may be adjusted as required, and the functions of a plurality of speed regulating buttons 131 may also be integrated in one button, e.g., a speed regulating knob. The lighting switch 133 is configured to control whether to turn on an illuminating lamp (not shown) provided on the electric tool 100. The power source 14 is configured to supply power to the walking unit 20 and the working unit 30. The power source 14 may include a single battery or a battery assembly composed of a plurality of batteries. The power-on switch 134 is configured to control whether the power source 14 supplies power to the walking unit 20 and the working unit 30. When the power-on switch 134 is turned on, the power source 14 supplies power to the walking unit 20 and the working unit 30; and when the power-on switch 134 is turned off, the power source 14 stops supplying power to the walking unit 20 and the working unit 30. The detection unit is configured to detect whether the walking unit 20 or the working unit 30 works within a preset time window. If the walking unit 20 or the working unit 30 does not work within the preset time window, the detection unit turns off the power-on switch 134 or directly cuts off the power source 14 to prevent an accident due to a user forgetting to turn off the power in time. In this embodiment, the speed regulating buttons 131, the reverse button 132, the lighting switch 133, and the power-on switch 134 are mechanical switches, but in other embodiments, the speed regulating buttons 131, the reverse button 132, the lighting switch 133, and the power-on switch 134 may also be membrane keys integrated in a membrane control panel, and may also be a touch panel or the like.

Referring to FIGS. 1, 2, and 3, the walking unit 20 includes a walking assembly 21, a walking control assembly 22, and a walking switch assembly 23. The walking assembly 21 includes wheels 211 mounted at the bottom of the frame 11 and a walking motor (not shown) that drives the wheels 211. The walking control assembly 22 is configured to control the walking motor to work. In this embodiment, the walking control assembly 22 includes a control circuit board. The walking switch assembly 23 includes a walking trigger switch (not shown) and a walking operating handle 231 that cooperates with the walking trigger switch. The walking operating handle 231 is pivotally mounted to a handle 121 and is close to a grip portion 122. When the walking operating handle 231 is pressed, the walking operating handle 231 abuts against the walking trigger switch, such that the walking control assembly 22 controls the walking motor to work, thereby driving the wheels 211 to work, causing the electric tool 100 to move forward or backward; and when the walking operating handle 231 is released, the walking operating handle 231 comes out of contact with the walking trigger switch, such that the walking control assembly 22 controls the walking motor to stop working, thereby causing the wheels 211 to stop rotating.

Referring to FIGS. 1, 2, and 3, the working unit 30 includes a working assembly 31, a working control assembly 32, and a working switch assembly 33. In this embodiment, the working assembly 31 is a snow sweeping assembly mounted to the front of the frame 10, but in other embodiments, the working assembly 31 may also be provided as a snow pushing assembly, a blowing and sucking assembly or the like, which is not limited in the present disclosure. The working assembly 31 includes an auger 311 and a working motor (not shown) that drives the auger 311 to work. The working control assembly 32 is configured to control working motor to work. In this embodiment, the working control assembly 32 includes a control circuit board. The working switch assembly 33 includes an operation trigger switch (not shown) and operation handles 331 that cooperate with the operation trigger switch. The operation handle 331 is pivotally mounted to an armrest frame 121 and is close to an armrest handle 122. When the operation handle 331 is pressed, the operation handle 331 abuts against the operation trigger switch, such that the working control assembly 32 controls the working motor to work, thereby driving the auger 311 to work, thus implementing a snow sweeping function; and when the operation handle 331 is released, the operation handle 331 comes out of contact with the operation trigger switch, such that the working control assembly 32 controls the working motor to stop working, thereby causing the auger 311 to stop working.

To facilitate a user controlling, with one hand, the walking assembly 21 and the working assembly 31 to work simultaneously, the walking assembly 21, the walking control assembly 22, the walking switch assembly 23, the working assembly 31, the working control assembly 32, and the working switch assembly 33 are further configured such that when at least one of the walking switch assembly 23 and the working switch assembly 33 is turned on, at least one of the walking control assembly 22 and the working control assembly 32 receives a lock signal; and when the walking switch assembly 23 and the working switch assembly 44 are both turned on, and then the switch assembly corresponding to the control assembly that receives the lock signal remains on and the switch assembly corresponding to the other control assembly is turned off, at that time the control assembly corresponding to the switch assembly that remains on simultaneously controls the walking assembly 21 and the working assembly 31; of course, it may be appreciated that the assemblies may also be configured such that when the walking switch assembly 23 and the working switch assembly 44 are both turned on, and then the switch assembly corresponding to the control assembly that receives the lock signal remains on, the control assembly corresponding to the switch assembly that remains on simultaneously controls the walking assembly 21 and the working assembly 31 to work. With this configuration, after the user activates the walking assembly 21 and the working assembly 31 by the walking switch assembly 23 and the working switch assembly 33 respectively, the user only needs to press the walking switch assembly 23 or the working switch assembly 33 with one hand to achieve the purpose of controlling the walking assembly 21 and the working assembly 31 to work simultaneously. Detailed description is provided below by specific examples.

Embodiment 1

In this embodiment, the walking control assembly 22 and the walking switch assembly 23 are configured such that after the walking switch assembly 23 is turned on, the walking control assembly 22 sends a lock signal to the working control assembly 32. Preferably, after the walking switch assembly 23 is turned on, the walking control assembly 22 immediately sends the lock signal to the working control assembly 32. Of course, it may be appreciated that in other implementations, the assemblies may also be configured such that after the walking switch assembly 23 is turned on, the walking control assembly 22 sends the lock signal to the working control assembly 32 after a delay of a preset time. The preset time may be set by the user. To use the electric tool 100, first the walking switch assembly 23 and the working switch assembly 33 are turned on to activate the walking assembly 21 and the working assembly 31 to work, then the walking switch assembly 23 is turned off and the working switch assembly 33 remains on, at which time the working control assembly 32 controls the walking assembly 21 and the working assembly 31 to continue working. It is to be noted that the turning on of the walking switch assembly 23 and the working switch assembly 33 is in no particular order, i.e., the technical solution of this embodiment can be achieved whether the walking switch assembly 23 or the working switch assembly 33 is turned on first. When the working switch assembly 33 is released, the working control assembly 32 controls the walking assembly 21 and the working assembly 31 to stop working. Preferably, when the working switch assembly 33 remains on and the working control assembly 32 controls the walking assembly 21 and the working assembly 31 to work, if the walking switch assembly 23 is turned on again, at that time the walking control assembly 22 sends an unlock signal to the working control assembly 32, such that the walking control assembly 22 regains control of the walking assembly 21, and the working control assembly 32 loses control of the walking assembly 21. In other embodiments, the working control assembly 32 may also be configured such that the working control assembly 32 immediately controls simultaneously the walking assembly 21 and the working assembly 31 to work after receiving the lock signal.

Embodiment 2

In this embodiment, the working control assembly 32 and the working switch assembly 33 are configured such that after the working switch assembly 33 is turned on, the working control assembly 32 sends a lock signal to the walking control assembly 22. Preferably, after the working switch assembly 33 is turned on, the working control assembly 32 immediately sends the lock signal to the walking control assembly 22. Of course, it may be appreciated that in other embodiments, the assemblies may also be configured such that after the working switch assembly 33 is turned on, the working control assembly 32 sends the lock signal to the walking control assembly 22 after a delay of a preset time. The preset time may be set by the user. To use the electric tool 100, first the walking switch assembly 23 and the working switch assembly 33 are turned on to activate the walking assembly 21 and the working assembly 31 to work, then the working switch assembly 33 is turned off and the walking switch assembly 23 remains on, at which time the walking control assembly 22 controls the walking assembly 21 and the working assembly 31 to continue working. It is to be noted that the turning on of the walking switch assembly 23 and the working switch assembly 33 is in no particular order, i.e., the technical solution of this embodiment can be achieved whether the walking switch assembly 23 or the working switch assembly 33 is turned on first. When the walking switch assembly 23 is turned off, the walking control assembly 22 controls the walking assembly 21 and the working assembly 31 to stop working. Preferably, when the walking switch assembly 23 remains on and the walking control assembly 22 controls the walking assembly 21 and the working assembly 31 to work, if the working switch assembly 33 is turned on again, at that time the working control assembly 32 sends an unlock signal to the walking control assembly 22, such that the working control assembly 32 regains control of the working assembly 31, and the walking control assembly 22 loses control of the working assembly 31. In other embodiments, the walking control assembly 22 may also be configured such that the walking control assembly 22 immediately controls simultaneously the walking assembly 21 and the working assembly 31 to work after receiving the lock signal.

Embodiment 3

In this embodiment, the walking control assembly 22, the walking switch assembly 23, the working control assembly 32, and the working switch assembly 33 are configured such that after the walking switch assembly 23 is turned on, the walking control assembly 22 sends a lock signal to the working control assembly 32; and after the working switch assembly 33 is turned on, the working control assembly 32 sends a lock signal to the walking control assembly 22. Preferably, after the walking switch assembly 23 and the working switch assembly 33 are turned on, the walking control assembly 22 and the working control assembly 32 immediately send the lock signals. Of course, it may be appreciated that in other embodiments, the assemblies may also be configured such that after the walking switch assembly 23 and the working switch assembly 33 are turned on, the walking control assembly 22 and the working control assembly 32 send the lock signals after a delay of a preset time. To use the electric tool 100, first the walking switch assembly 23 and the working switch assembly 33 are turned on to activate the walking assembly 21 and the working assembly 31 to work. Then the working switch assembly 33 is turned off and the walking switch assembly 23 remains on, at which time the walking control assembly 22 controls the walking assembly 21 and the working assembly 31 to continue working; and when the walking switch assembly 23 is turned off, the walking control assembly 22 controls the walking assembly 21 and the working assembly 31 to stop working. Of course, in this embodiment, it is also possible that the walking switch assembly 23 is turned off and the working switch assembly 33 remains on, at which time the working control assembly 32 controls the walking assembly 21 and the working assembly 31 to continue working; and when the working switch assembly 33 is turned off, the working control assembly 32 controls the walking assembly 21 and the working assembly 31 to stop working. Preferably, when the walking switch assembly 23 remains on and the walking control assembly 22 controls the walking assembly 21 and the working assembly 31 to work, if the working switch assembly 33 is turned on again, at that time the working control assembly 32 sends an unlock signal to the walking control assembly 22, such that the working control assembly 32 regains control of the working assembly 31, and the walking control assembly 22 loses control of the working assembly 31; and when the working switch assembly 33 remains on and the working control assembly 32 controls the walking assembly 21 and the working assembly 31 to work, if the walking switch assembly 23 is turned on again, at that time the walking control assembly 22 sends an unlock signal to the working control assembly 32, such that the walking control assembly 22 regains control of the walking assembly 21, and the working control assembly 32 loses control of the walking assembly 21. With this configuration, the user may select, as needed, one of the walking switch assembly 23 and the working switch assembly 33 to simultaneously control the walking assembly 21 and the working assembly 31 to work.

In embodiments 1, 2 and 3, the walking control assembly 22, the walking switch assembly 23, the working control assembly 32, and the working switch assembly 33 are all configured such that after the walking switch assembly 23 is turned on, the walking control assembly 22 sends a lock signal immediately or after a delay of a preset time; and after the working switch assembly 33 is turned on, the working control assembly 32 sends a lock signal immediately or after a delay of a preset time. However, in other embodiment, the walking control assembly 22 and the walking switch assembly 23, the working control assembly 32, and the working switch assembly 33 may also be configured such that when the walking switch assembly 23 is turned off, the walking control assembly 22 immediately sends a lock signal, and at that time if the working switch assembly 33 is in an on state, the working control assembly 32 simultaneously controls the walking assembly 21 and the working assembly 31 to work; and when the working switch assembly 33 is turned off, the working control assembly 32 immediately sends a lock signal, and at that time if the walking switch assembly 23 is in an on state, the walking switch assembly 22 simultaneously controls the walking assembly 21 and the working assembly 32 to work.

Compared with the prior art, the electric tool 100 of the present disclosure has the beneficial effect that as one of the walking control assembly 22 and the working control assembly 32 sends a lock signal to the other, the walking control assembly 22 or the working control assembly 32 can simultaneously control the walking assembly 21 and the working assembly 31 to work, which enables the user to control, with one hand, the walking assembly 21 and the working assembly 31 to work at the same time, thereby facilitating the user in controlling, with the other hand, other functional assemblies without stopping the machine, thus effectively improving the efficiency of the user.

Figure 4:
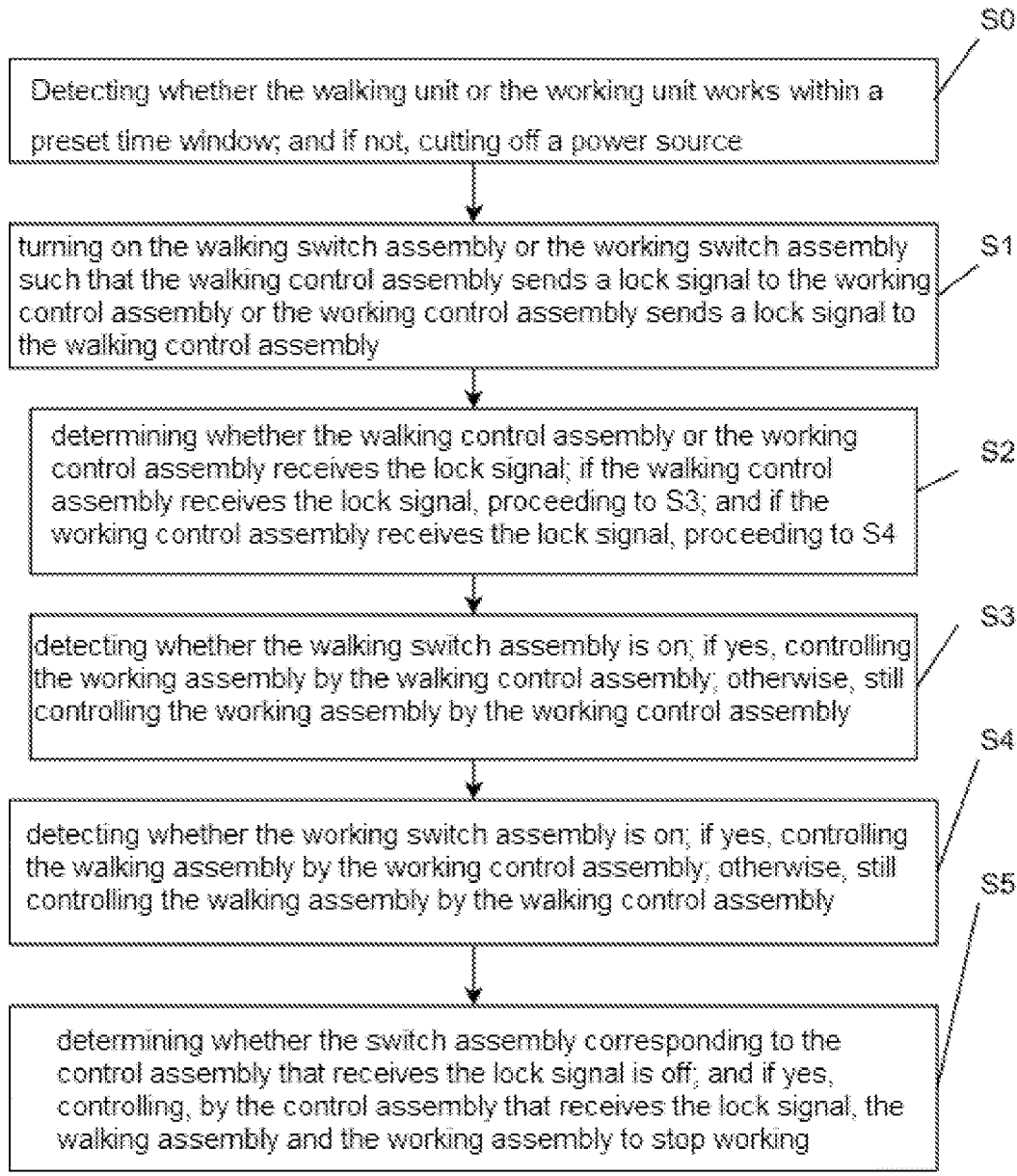
FIG. 4 is a flowchart illustrating a method for controlling an electric tool according to an embodiment of the present disclosure.

Referring to FIG. 4, the present disclosure further discloses a method for controlling an electric tool, including the following steps:

S0: after the power source 14 is connected, detecting whether the walking unit 20 or the working unit 30 works within a preset time window; and if not, cutting off the power source 14.

Figure 5:
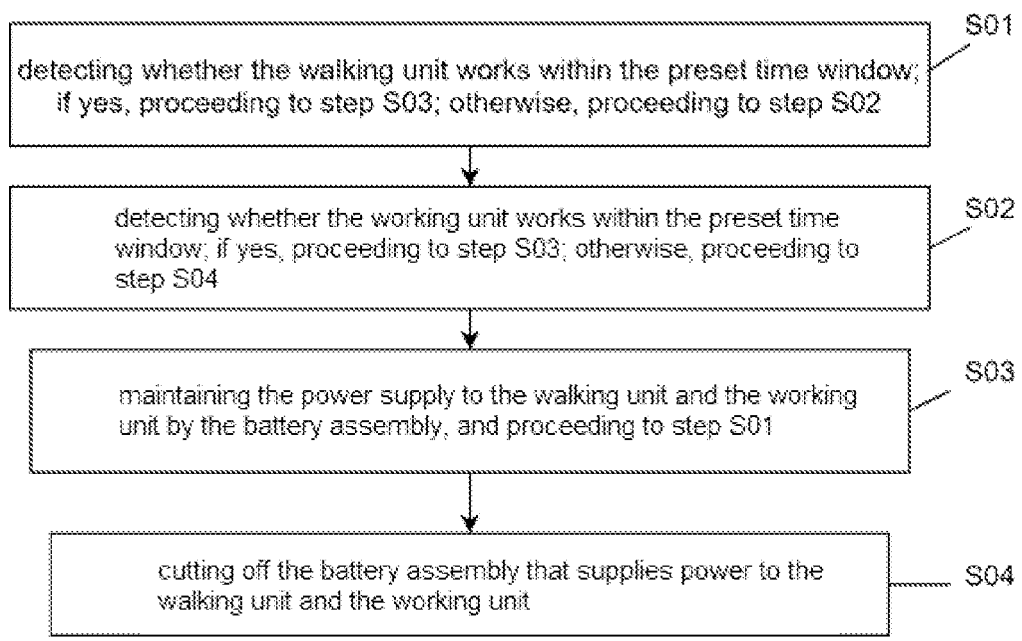
FIG. 5 is a flowchart illustrating step S0 in the flowchart shown in FIG. 4.

Preferably, referring to FIG. 5, step S0 further includes the following steps:

S01: detecting whether the walking unit 20 works within the preset time window; if yes, proceeding to step S03; otherwise, proceeding to step S02.

S02: detecting whether the working unit 30 works within the preset time window; if yes, proceeding to step S03; otherwise, proceeding to step S04.

S03: maintaining the power supply to the walking unit 20 and the working unit 30 by the power source 14, and proceeding to step S01.

At step S03 of this embodiment, after maintaining the power supply to the walking unit 20 and the working unit 30 by the power source 14, the method immediately proceeds to step S01. This configuration leads to a great workload of cyclic detection in step S0. Therefore, preferably, in step S03, after maintaining the power supply to the walking unit 20 and the working unit 30 by the power source 14, the method proceeds to step S01 after a preset time T. This configuration can effectively reduce the cyclic detection workload of step S0 while achieving the function of step S0. The time T may be preset by the manufacturer or set by the user as needed.

S04: cutting off the power source 14 that supplies power to the walking unit 20 and the working unit 30.

In this embodiment, at step S0, the walking unit 20 is detected before the working unit 30, but in other embodiments, the working unit 30 may also be detected before the walking unit 20, and the walking unit 20 and the working unit 30 may also be detected simultaneously.

S1: turning on the walking switch assembly 23 or the working switch assembly 33 such that the walking control assembly 22 sends a lock signal to the working control assembly 32 or the working control assembly 32 sends a lock signal to the walking control assembly 22.

Preferably, when the walking switch assembly 23 is turned on, the walking control assembly 22 immediately sends a lock signal to the working control assembly 32; and when the working switch assembly 33 is turned on, the working control assembly 32 immediately sends a lock signal to the walking control assembly 22. Of course, the assemblies may also be configured such that when the walking switch assembly 23 is turned on, the walking control assembly 22 sends a lock signal to the working control assembly 32 after a delay of a preset time; and when the working switch assembly 33 is turned on, the working control assembly 32 sends a lock signal to the walking control assembly 22 after a delay of a preset time. The assemblies may also be configured such that: after the walking switch assembly 23 and the working switch assembly 33 are both turned on, when the walking switch assembly 23 is turned off, the walking control assembly 22 sends a lock signal to the working control assembly 32; and when the working switch assembly 33 is turned off, the working control assembly 32 sends a lock signal to the walking control assembly 22.

Figure 6:
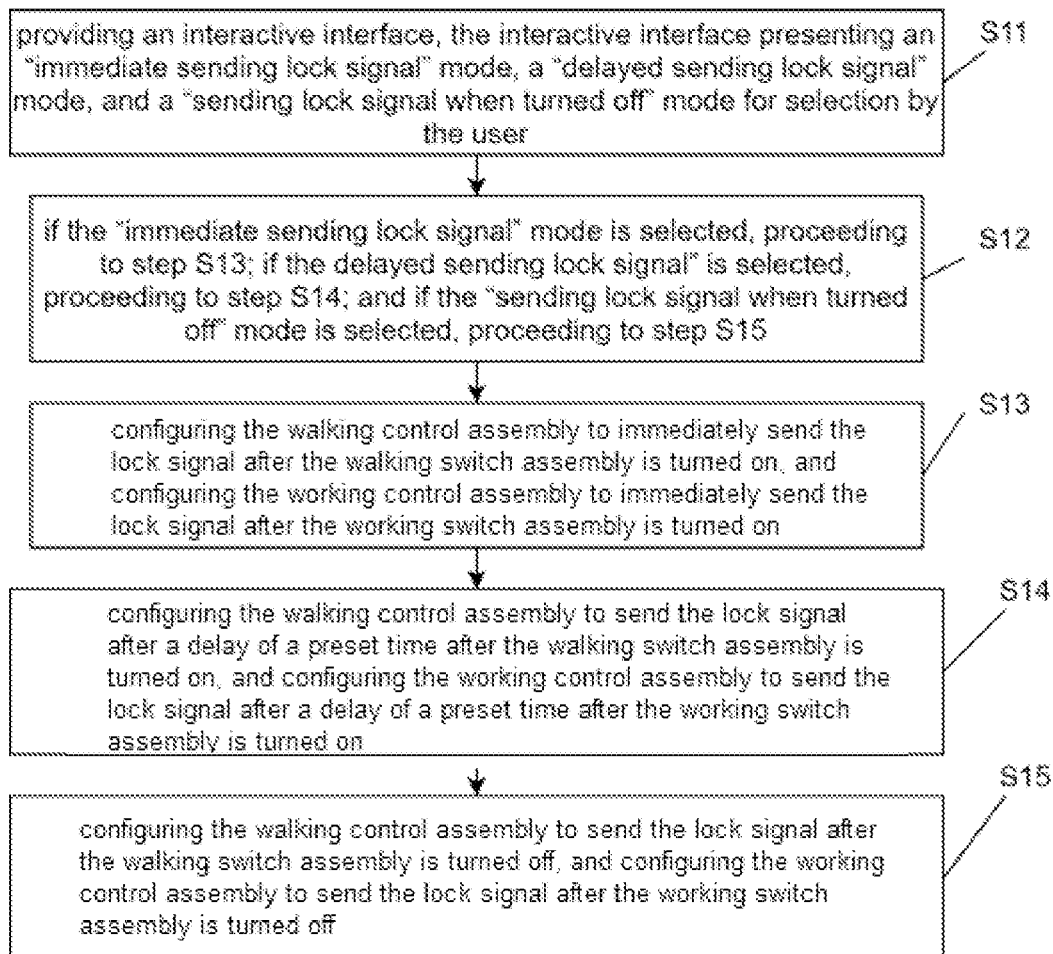
FIG. 6 is a flowchart illustrating step S1 in the flowchart shown in FIG. 4.

Preferably, referring to FIG. 6, in other embodiments, step S1 further includes the following steps:

S11: providing an interactive interface, the interactive interface presenting an "immediate sending lock signal" mode, a "delayed sending lock signal" mode, and a "sending lock signal when turned off" mode for selection by the user.

S12: if the "immediate sending lock signal" mode is selected, proceeding to step S13; if the delayed sending lock signal" is selected, proceeding to step S14; and if the "sending lock signal when turned off" mode is selected, proceeding to step S15.

S13: configuring the walking control assembly 22 to immediately send the lock signal after the walking switch assembly 23 is turned on, and configuring the working control assembly 32 to immediately send the lock signal after the working switch assembly 33 is turned on.

S14: configuring the walking control assembly 22 to send the lock signal after a delay of a preset time after the walking switch assembly 23 is turned on, and configuring the working control assembly 32 to send the lock signal after a delay of a preset time after the working switch assembly 33 is turned on.

S15: configuring the walking control assembly 22 to send the lock signal after the walking switch assembly 23 is turned off, and configuring the working control assembly 32 to send the lock signal after the working switch assembly 33 is turned off.

S2: determining whether the walking control assembly 22 or the working control assembly 32 receives the lock signal; if the walking control assembly 22 receives the lock signal, proceeding to S3; and if the working control assembly 32 receives the lock signal, proceeding to S4.

S3: detecting whether the walking switch assembly 23 is on; if yes, controlling the working assembly 31 by the walking control assembly 22; otherwise, still controlling the working assembly 31 by the working control assembly 32.

S4: detecting whether the working switch assembly 33 is on; if yes, controlling the walking assembly 21 by the working control assembly 32; otherwise, still controlling the walking assembly 21 by the walking control assembly 22.

S5: determining whether the switch assembly corresponding to the control assembly that receives the lock signal is off; and if yes, controlling, by the control assembly that receives the lock signal, the walking assembly 21 and the working assembly to 31 to stop working.

Figure 7:
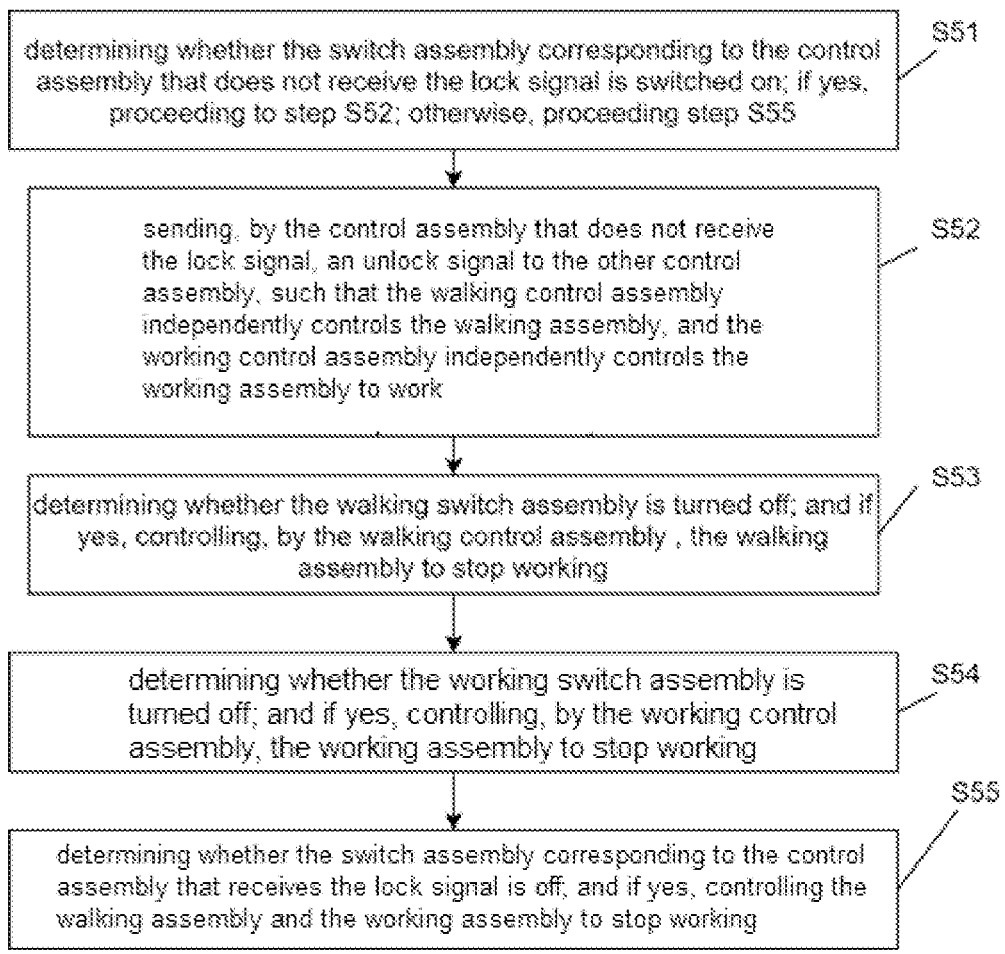
FIG. 7 is a flowchart illustrating step S5 in the flowchart shown in FIG. 4.

Preferably, referring to FIG. 7, step S5 further includes the following steps:

S51: determining whether the switch assembly corresponding to the control assembly that does not receive the lock signal is switched on; if yes, proceeding to step S52; otherwise, proceeding step S55.

S52: sending, by the control assembly that does not receive the lock signal, an unlock signal to the other control assembly, such that the walking control assembly 22 independently controls the walking assembly 21, and the working control assembly 32 independently controls the working assembly 31 to work.

S53: determining whether the walking switch assembly 23 is turned off; and if yes, controlling, by the walking control assembly 22, the walking assembly 21 to stop working.

S54: determining whether the working switch assembly 33 is turned off; and if yes, controlling, by the working control assembly 32, the working assembly 31 to stop working.

S55: determining whether the switch assembly corresponding to the control assembly that receives the lock signal is off; and if yes, controlling the walking assembly 21 and the working assembly 31 to stop working.

The above embodiments are only used for illustrating the technical solutions of the present disclosure rather than for limitations. Although the present disclosure is described in detail with reference to the preferred embodiments, those of ordinary skill in the art should understand that they can still make modifications or equivalent substitutions to the technical solutions of the present disclosure without departing from the spirit and scope of the technical solutions of the present disclosure.

The invention claimed is:

1. An electric tool, comprising:
a walking unit, comprising a walking assembly, a walking control assembly, and a walking switch assembly, wherein the walking control assembly controls the walking assembly to work when the walking switch assembly is turned on, and
a working unit, comprising a working assembly, a working control assembly, and a working switch assembly, wherein the working control assembly controls the working assembly to work when the working switch assembly is turned on; wherein
wherein
when the walking switch assembly is being operated, the working control assembly receives a lock signal, and the working switch assembly corresponding to the working control assembly receiving the lock signal is on, the working control assembly receiving the lock signal simultaneously controls the walking assembly and the working assembly to work;

when the working switch assembly is being operated, the walking control assembly receives a lock signal, and the walking switch assembly corresponding to the walking control assembly receiving the lock signal is on, the walking control assembly receiving the lock signal simultaneously controls the walking assembly and the working assembly to work; or when both the walking switch assembly and the working switch assembly are being operated, the walking control assembly receives a lock signal, and the walking switch assembly corresponding to the walking control assembly receiving the lock signal is on, the walking control assembly receiving the lock signal simultaneously controls the walking assembly and the working assembly to work; or when both the walking switch assembly and the working switch assembly are being operated, the working control assembly receives a lock signal, and the working switch assembly corresponding to the working control assembly receiving the lock signal is on, the working control assembly receiving the lock signal simultaneously controls the walking assembly and the working assembly to work.

2. The electric tool as claimed in claim 1, wherein when the walking switch assembly is turned on, the walking control assembly sends a lock signal to the working control assembly; when the working switch assembly is turned on, the working control assembly sends a lock signal to the walking control assembly; and when the walking switch assembly and the working switch assembly are initially in an on state, and either one thereof is then switched off, the control assembly corresponding to the switch assembly that is not switched off controls simultaneously the walking assembly and working assembly to work.

3. The electric tool as claimed in claim 1, wherein after the walking switch assembly is turned on, the walking control assembly sends a lock signal to the working control assembly; and when the working switch assembly is in an on state, the working control assembly that receives the lock signal simultaneously controls the walking assembly and the working assembly to work.

4. The electric tool as claimed in claim 2, wherein after the walking switch assembly is turned on, the walking control assembly immediately sends the lock signal to the working control assembly.

5. The electric tool as claimed in claim 2, wherein after the walking switch assembly is turned on, the walking control assembly sends the lock signal to the working control assembly after a delay of preset time.

6. The electric tool as claimed in claim 1, wherein after the working switch assembly is turned on, the working control assembly sends a lock signal to the walking control assembly; and when the walking switch assembly is in an on state, the walking control assembly that receives the lock signal simultaneously controls the walking assembly and the working assembly to work.

7. The electric tool as claimed in claim 6, wherein after the working switch assembly is turned on, the working control assembly immediately sends the lock signal to the walking control assembly.

8. The electric tool as claimed in claim 6, wherein after the working switch assembly is turned on, the working control assembly sends the lock signal to the walking control assembly after a delay of a preset time.

9. The electric tool as claimed in claim 1, wherein when the walking switch assembly is turned off, the walking control assembly sends a lock signal to the working control assembly; when the working switch assembly is turned off, the working control assembly sends a lock signal to the walking control assembly; and when the walking switch assembly and the working switch assembly are initially in an on state, and then either one thereof is switched off, the control assembly corresponding to the switch assembly that is not switched off controls simultaneously the walking assembly and working assembly to work.

10. The electric tool as claimed in claim 1, wherein when a switch assembly in an off state is turned on again, the control assembly corresponding to the switch assembly that is turned on again sends an unlock signal to the control assembly corresponding to the switch assembly remains on, at which time the walking control assembly controls only the walking assembly, and the working control assembly controls only the working assembly.

11. The electric tool as claimed in claim 1, wherein the electric tool is further provided with a power source and a power-on switch; and when the power-on switch is turned on, the power source supplies power to the walking unit and/or working unit.

12. The electric tool as claimed in claim 11, wherein the electric tool is further provided with a detection unit to detect whether the walking unit or the working unit works within a preset time window; and if the walking unit or working unit does not work within the preset time window, the detection unit turns off the power-on switch or cuts off the power source.

13. The electric tool as claimed in claim 1, wherein the working assembly is a snow sweeping assembly.

14. A method for controlling an electric tool, wherein the electric tool comprises a walking unit and a working unit, wherein the walking unit comprises a walking assembly, a walking control assembly, and a walking switch assembly, wherein the working unit comprises a working assembly, a working control assembly, and a working switch assembly, wherein the method comprises:
  turning on the walking switch assembly or the working switch assembly such that the walking control assembly sends a lock signal to the working control assembly or the working control assembly sends a lock signal to the walking control assembly;
  determining whether the walking control assembly or the working control assembly receives the lock signal; if the walking control assembly receives the lock signal, proceeding to detect whether the walking switch assembly is on; and if the working control assembly receives the lock signal, proceeding to detect whether the working switch assembly is on;
  detecting whether the walking switch assembly is on; if yes, controlling the working assembly by the walking control assembly; otherwise, still controlling the working assembly by the working control assembly;
  detecting whether the working switch assembly is on; if yes, controlling the walking assembly by the working control assembly; otherwise, still controlling the walking assembly by the walking control assembly;
  determining whether the switch assembly corresponding to the control assembly that receives the lock signal is off; and if yes, controlling, by the control assembly that receives the lock signal, the walking assembly and the working assembly to stop working; and
  determining whether the switch assembly corresponding to the control assembly that does not receive the lock signal is switched on; and if yes, sending, by the control assembly that does not receive the lock signal, an unlock signal to the other control assembly, such that the walking control assembly independently controls the walking assembly to work, and the working control assembly independently controls the working assembly to work.

15. The method for controlling an electric tool as claimed in claim 14, wherein the walking control assembly immediately sends the lock signal to the working control assembly, or the working control assembly immediately sends the lock signal to the walking control assembly.

16. The method for controlling an electric tool as claimed in claim 14, wherein the walking control assembly sends the lock signal to the working control assembly after a delay of a preset time, or the working control assembly sends the lock signal to the walking control assembly after a delay of a preset time.

17. The method for controlling an electric tool as claimed in claim 14, wherein when the walking switch assembly is turned off after the walking switch assembly is turned on, the walking control assembly sends the lock signal to the working control assembly.

18. The method for controlling an electric tool as claimed in claim 14, wherein when the working switch assembly is turned off after the working switch assembly is turned on, the working control assembly sends the lock signal to the walking control assembly.

19. The method for controlling an electric tool as claimed in claim 14, further comprising: detecting whether the walking unit or the working unit works within a preset time window; and if not, cutting a battery assembly that supplies power to the walking unit and/or the working unit.

* * * * *